United States Patent [19]

Leete

[11] Patent Number: 4,536,873

[45] Date of Patent: Aug. 20, 1985

[54] DATA TRANSMISSION SYSTEM

[75] Inventor: Tom G. Leete, Plano, Tex.

[73] Assignee: Honeywell Inc., Phoenix, Ariz.

[21] Appl. No.: 591,292

[22] Filed: Mar. 19, 1984

[51] Int. Cl.$^3$ .............................................. H04J 3/02
[52] U.S. Cl. ........................................ 370/85; 370/86; 340/825.5
[58] Field of Search .............. 370/85, 86; 340/825.05, 340/825.5, 825.51

[56] References Cited

U.S. PATENT DOCUMENTS

| | | | |
|---|---|---|---|
| 3,932,841 | 1/1976 | Deerfield et al. | 370/85 |
| 4,242,749 | 12/1980 | Takezoe | 370/85 |
| 4,292,623 | 9/1981 | Eswaran et al. | 370/85 |
| 4,342,995 | 8/1982 | Shima | 370/85 |
| 4,380,052 | 4/1983 | Shima | 370/85 |

Primary Examiner—Douglas W. Olms
Attorney, Agent, or Firm—A. A. Sapelli; J. S. Solakian; L. J. Marhoefer

[57] ABSTRACT

The present invention relates to a data transmission system wherein a central station having a plurality of router elements exchanges data via a bus which is operatively connected to each router element. Further, each router element is connected to a next adjacent router element via a plurality of parallel lines forming a ring configuration. Each router element transmits a control message around the ring indicating availability to receive data. As the control message is transmitted around the ring each router element can examine the control message and indicate that data will be transmitted to it during the next cycle. Once a control message is accepted, no other router element around the ring can accept the control message during that cycle. Simultaneously with the transfer of the control message around the ring during the cycle, data is transferred on the bus as indicated by the control message of the previous cycle.

9 Claims, 8 Drawing Figures

DATA TRANSMISSION SYSTEM

BACKGROUND OF THE INVENTION

The present invention relates to a transmission system, and more particularly, to a digital transmission system for transmitting packets of information on a bus between devices coupled to the bus, control information being transmitted around a separate control ring.

In transmission systems having a plurality of devices, such as telephones, terminals, controllers and processors coupled to a transmission medium, some form of dialog or communication exchange generally takes place between these devices via the transmission medium. In order to provide for an orderly exchange of information between devices, various network architectures and schemes have been devised; however, many of the existing transmission systems are complex, inefficient, and require large amounts of complex hardware. This is especially true with transmission systems utilizing packet switching schemes. Such schemes require the use of at least one host processor, a number of communication processors (or front end processors), the software associated with each of the processors which is generally very large and very complex, and communication interface devices which interface or couple a user device with the transmission medium. In addition, present systems do not provide for maximum utilization of available bandwidth. Time slots allocated during a communication sequence are essentially wasted when no data is to be transmitted during a lull or quiet period.

Hence, it is desirable to provide a transmission system for interdevice communication which is high speed and overcomes the disadvantages and limitations of existing systems; namely utilizing currently unused slots thereby increasing bandwidth efficiency. The data transmission system of the present invention transmits a control message via a parallel ring coupled to all the routers (each router having a plurality of devices attached thereto) in a ring fashion, for controlling data transmitted via a bus coupled to each router.

SUMMARY OF THE INVENTION

Therefore, there is supplied by the present invention a data transmission system implementing a communications scheme between a plurality of devices, wherein the data tramsmission system has a central station, having a plurality of input/output formatters operatively connected to the central station, each input/output formatter having a plurality of devices coupled thereto, for exchanging data from a first of the plurality of input/output formatters to a second of the plurality of input/output formatters. The central station comprises a plurality of router elements, each of the router elements being operatively connected to a serial data bus, wherein the serial data bus includes a plurality of serial data bus lines, and each of the router elements being operatively connected to a next adjacent router element via a plurality of parallel lines thereby forming a ring. Each router element controls the exchange of the data in response to a corresponding control message transmitted by each of the router elements via the ring during a first cycle to indicate transmission of the data from the first of the plurality of input/output formatters on its corresponding serial data bus lines during a next sequential cycle. A plurality of buffer memory elements is included. Each buffer memory element is operatively connected to a corresponding router element and is operatively connected to a corresponding input/output formatter. Further, each buffer memory element is operatively connected to the corresponding serial data bus line of the serial data bus, for interfacing with the corresponding router element to cause the data to be operatively coupled to and from the serial data bus in response to the control message.

Accordingly, it is an object of the present invention to provide a transmission system for transferring information between devices.

It is still another object of the invention to provide a transmission system for transferring information between devices coupled to a transmission medium.

It is a further object of the present invention to provide a transmission system for transferring information between devices operatively connected to a transmission medium, wherein the transmission medium is in the form of a bus.

It is still a further object of the present invention to provide a transmission system for transferring information between devices via a serial bus, wherein control information is transmitted around a ring.

These and other objects of the present invention will become more apparent when taken in conjunction with the following description and attached drawings, wherein like characters indicate like parts, and which drawings form a part of the present invention.

DETAILED DESCRIPTION

Figure 1:
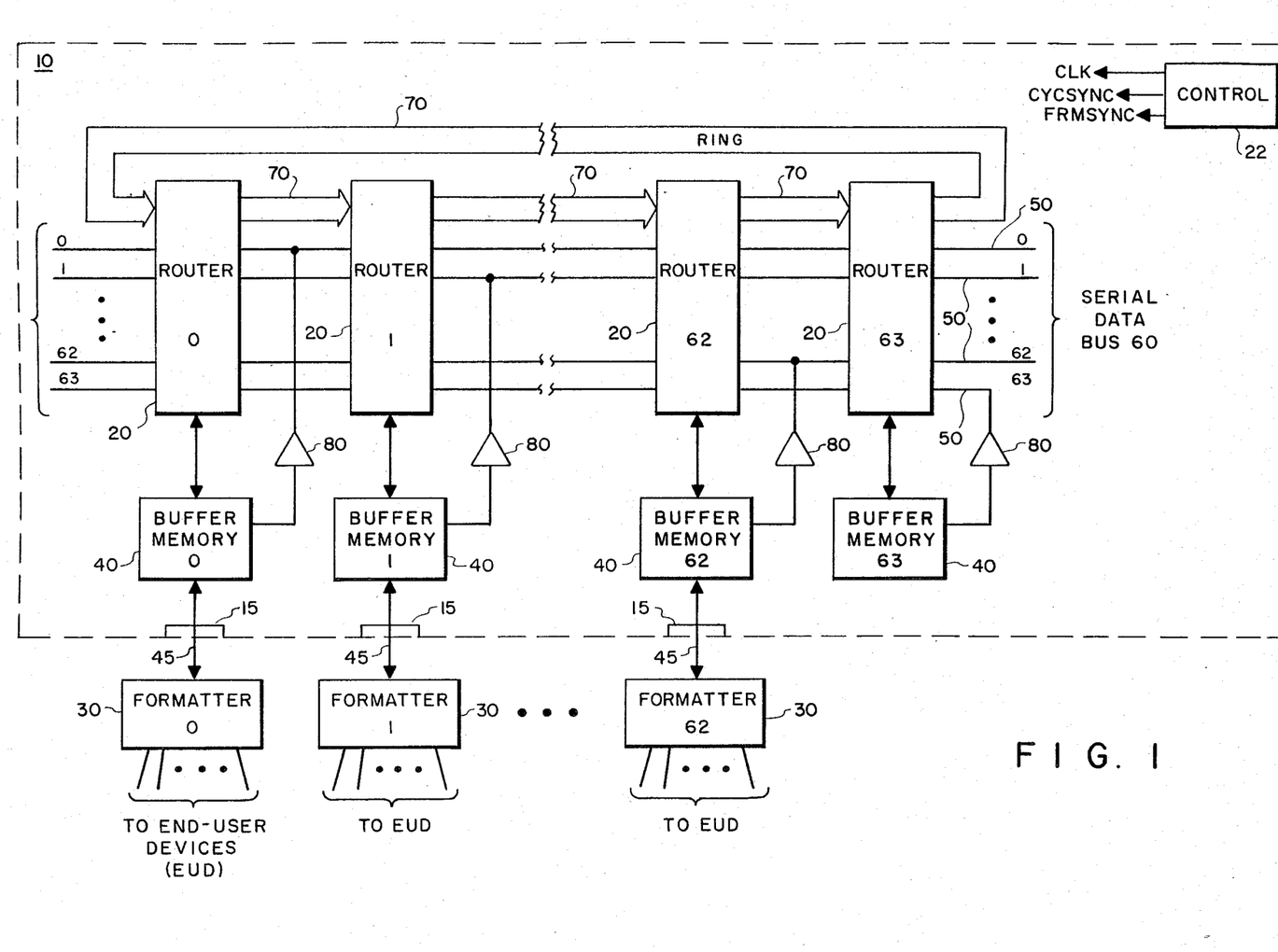
FIG. 1 shows a functional block diagram of the preferred embodiment of the transmission system of the present invention.

FIG. 1 shows a functional block diagram of the preferred embodiment of the transmission system of the present invention. A plurality of end user devices (EUD) (not shown), which includes such devices as telephones, terminals, . . . , are each operatively connected to a corresponding formatter 30. Each formatter 30 is operatively connected via a data link 45 to a corresponding port 15 of a central station 10, the central station 10 effectively causing data to be exchanged between two EUD. The control station 10 comprises a plurality of routers 20 and a plurality of buffer memories 40. Each router 20 is associated with a corresponding buffer memory 40, each buffer memory 40 interfacing with the corresponding port 15 of the central station 10. Each router is operatively connected to a plurality of serial data bus lines 0–63, 50 which makes up the serial data bus 60. Further, each router 20 is operatively connected to a next adjacent router 20 via parallel lines 70, the parallel lines forming a ring 70 thereby connecting all the routers 20 in a ring configuration. Each buffer memory 40 outputs serial data to a corresponding serial data bus line 50 via driver 80. A control element (CONTROL) 22 generates the clocking signal (CLK), and timing signals, CYCSYNC and FRMSYNC which defines the time frames for the information transfer of the transmission system of the present invention.

Each formatter 30 (or sometimes referred to herein as a concentrator) interfaces with a plurality of end user devices (or more simply devices) such as telephones, terminals, processors, computers (not shown), . . . Each concentrator 30 formats the data received from the end user devices attached thereto in a predetermined format for transmission to its respective router 20 via its respective buffer memory 40, and further causes data received from the buffer memory 40 to be transmitted to a specified destination end user device. The concentrators 30 append a destination address to packets originating form devices not having the capability of attaching the destination addresses. The concentrators 30 may take many forms depending upon the data devices coupled to the concentrator 30, one form including a microprocessor. Concentrators 30 are generally well known in the art and will not be discussed further since it forms no part of the present invention and is not necessary for an understanding of the present invention. Buffer memory 40 stores the data received from the concentrator 30 for transmission to the router 20 during the proper time period. The buffer memory 40 will be described further hereinunder.

Figure 2:
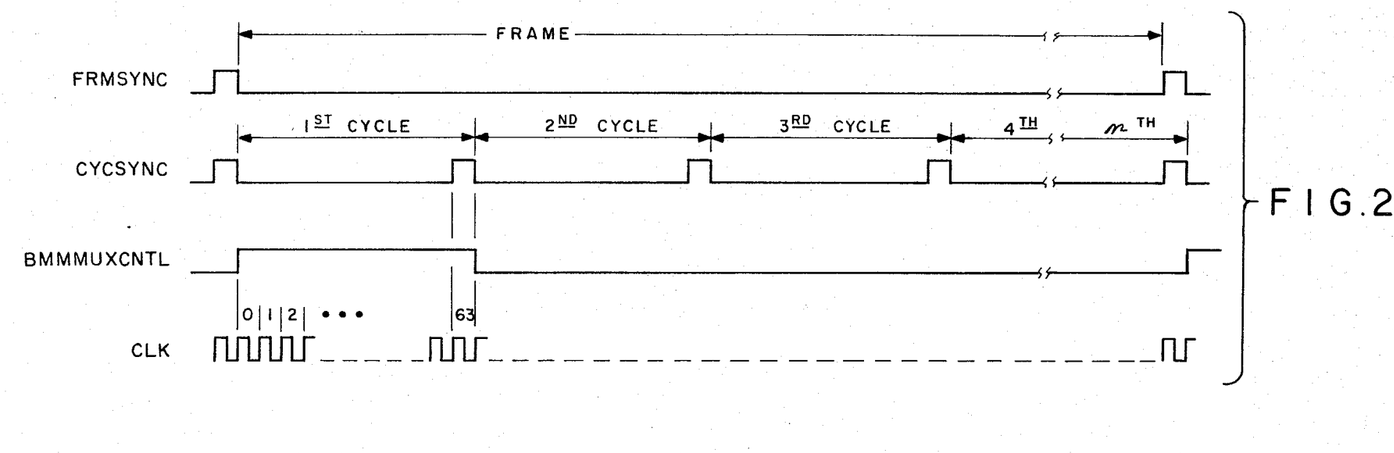
FIG. 2 shows the overall control timing for the operation of the transmission of data by the present invention.
Figure 3:
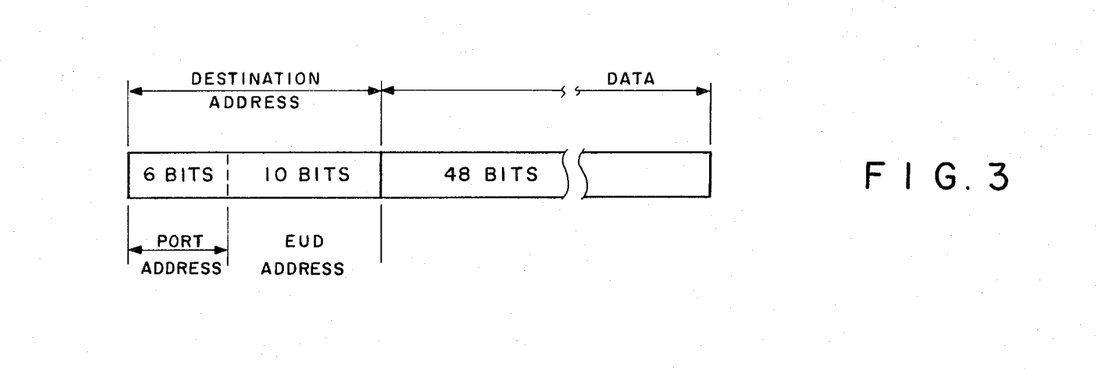
FIG. 3 shows the format of the data utilized by the preferred embodiment of the present invention.

A general description of the overall operation of the data transmission system of the preferred embodiment of the present invention will now be discussed in conjunction with FIG. 1 and FIG. 2. The transmission period of data occurs in time frames, a frame being defined as a period of time which occurs between frame pulses, FRMSYNC. Each frame is divided into N cycles, a cycle being defined by a timing signal, CYCSYNC. In the preferred embodiment, each cycle is a time period of 64 clock times, i.e. contains 64 clock pulses, CLK. The first cycle of each frame is utilized by the router 20 for the initialization of the transmissions which occur during the remaining cycles of the frame. For this reason, Buffer Memory 63 has no EUD/Formatter 30 coupled thereto. A control signal BMM MUX CNTL is high as shown in FIG. 2 during cycle 1 to enable initialization data to be loaded into the router 20 from the respective buffer memory 40. Each subsequent cycle of the frame is utilized to transmit a token (or control message) around the ring 70, and data is transmitted on the various serial data bus lines 50 in response to control information contained in the token. The token passes control message information between routers which indicates to the router 20 to receive data from another router 20 of the transmission system which is a sender. At the beginning of each cycle (exclusive of cycle one) each router outputs its own token which indicates the router is available to receive data. At each clock time of the cycle, the tokens are shifted to the next adjacent router 20. Each router 20 has a down counter for identifying the originating router of the token currently being reviewed. If a router 20 determines it has a message to send to the router corresponding to the current token being reviewed, and the token contains an available message, and the router 20 has not accepted a token during this cycle, a router 20 substitutes its ID for the available token. In this manner, as the token is transferred around the ring 70 during the cycle, subsequent routers 20 can determine whether the router is available to receive data or not. At the end of the cycle, each router receives its own token which it initially outputted. By examining the token, the router 20 can determine if a message is to be received during the next cycle, and specifically, which router 20 is to be the sender. By decoding the ID in the token, the router 20 can select the proper serial data bus line 50 corresponding to the router 20 of the sender. In a like fashion, the buffer memory 40 of the sending router 20 enables its corresponding line driver 80 for outputting the data on its respective serial data bus line 50. The transmission of data occurs on the serial data bus 60 simultaneously with the transmission of the token around the ring 70. In 64 clock times, the token will have been transmitted around the ring 70 and received back by the initiating router 20. The data in the preferred embodiment of the present invention is 64 bits. (The format of the data of the preferred embodiment of the present invention, shown in FIG. 3, includes 16 destination address bits, ten of which are utilized by the receiving formatter 30 in order to properly channel the data to the correct end user device, and 48 data bits). Also, transfer of the data serially over the serial data bus line 50 utilizes 64 clock times (CLK). Hence, during one cycle a complete block of data of 64 bits is transmitted on the serial data bus line 50 simultaneously with the token being transmitted around the ring 70.

Figure 4:
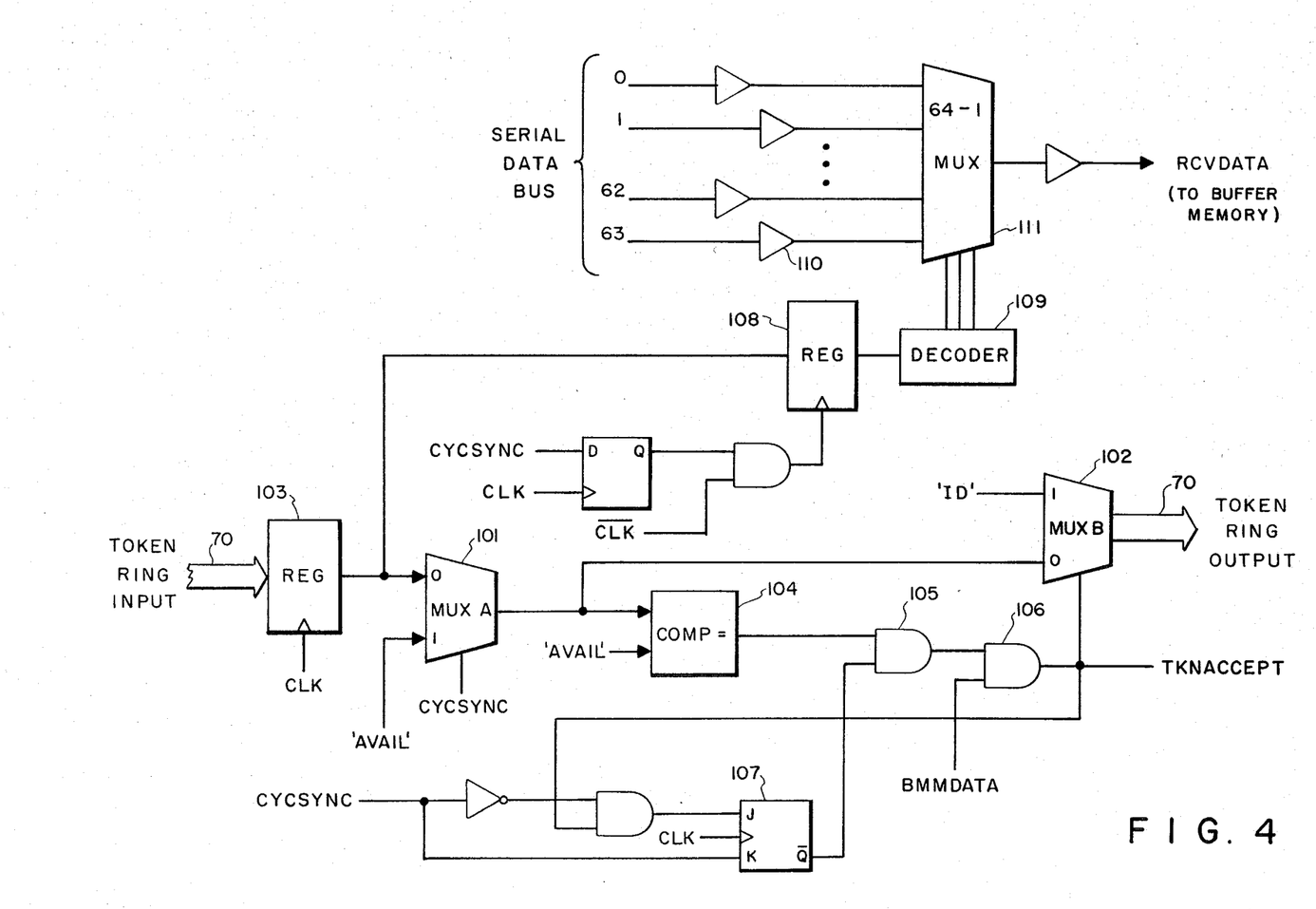
FIG. 4 shows the token ring logic of each router.

The detailed description of the router 20 will now be given. Referring to FIG. 4, the token (or token ring) logic of each router 20 is shown. At the beginning of each cycle, the available token "AVAIL" is outputted. The available token is a value of all "ones", i.e., in the preferred embodiment of the present invention, six binary ones form the available token, equal to the number of parallel lines of the ring 70. At the beginning of each cycle, the available token, "AVAIL" of each router 20 is outputted from MUX A 101 to MUX B 102. The output of MUX B 102 is the token ring output 70. Since BMMDATA is low during the first clock time each cycle, TKNACCEPT will be a logic 0. Thus, the 0 side of MUX B 102 is selected, thereby allowing the available token "AVAIL" to be outputted onto the ring 70. The generation of BMMDATA will be described later. Each subsequent clock time of the cycle, the token outputted via token ring output 70, is received by the next adjacent router 20 on the token ring input 70 and clocked into register 103. The token temporarily stored in register 103 is coupled to comparator COMP 104 to determine if the token indicates an available token. If the token is available and no other token has been accepted from any previous router 20 examining the token, AND gate 105 is enabled, partially enabling AND gate 106. If data is to be transmitted to the router which transmitted the token currently being held in register 103, BMM DATA will be high thereby accepting the token, the TKNACCEPT signal going high (a logic one), setting flip flop 107 and selecting the one output of MUX B 102. The token outputted from MUX B 102 is then modified to be the ID of the router 20, each router having a unique ID (e.g., in the preferred embodiment the routers are numbered 0–63 and the ID corresponds to these numbers). On the next clock the token as modified will be passed to the next adjacent router 20. During the rest of the cycle as that particular token is passed around ring 70, the comparator 104 of each of the following routers in the ring 70 will not compare and hence no other router 20 can accept that token. After 64 clock times the token will have been transmitted around the entire ring. Each router will have the token, modified or unmodified, it initiated stored in its respective register 103. At this point in time register 108 is clocked to receive the token stored in register 103. If the token still indicates all ones, then no router in the central station 10 accepted the token, i.e., no router 20 has data to transmitted to that router 20. Decoder 109 will then select serial data bus line 63 and receives dummy data from router 63. If the token contains anything but the available token, the token indicates the ID of the router desiring to transmit to that router 20. Therefore, decoder 109 will select one of the serial data bus lines 50 via 64-1 MUX 111 corresponding to the ID in the token. The router 20 which modified the token transmits data serially at the start of the next cycle on its respective serial data bus line via driver 80 and the data is received by the receiving router 20.

Figure 5:
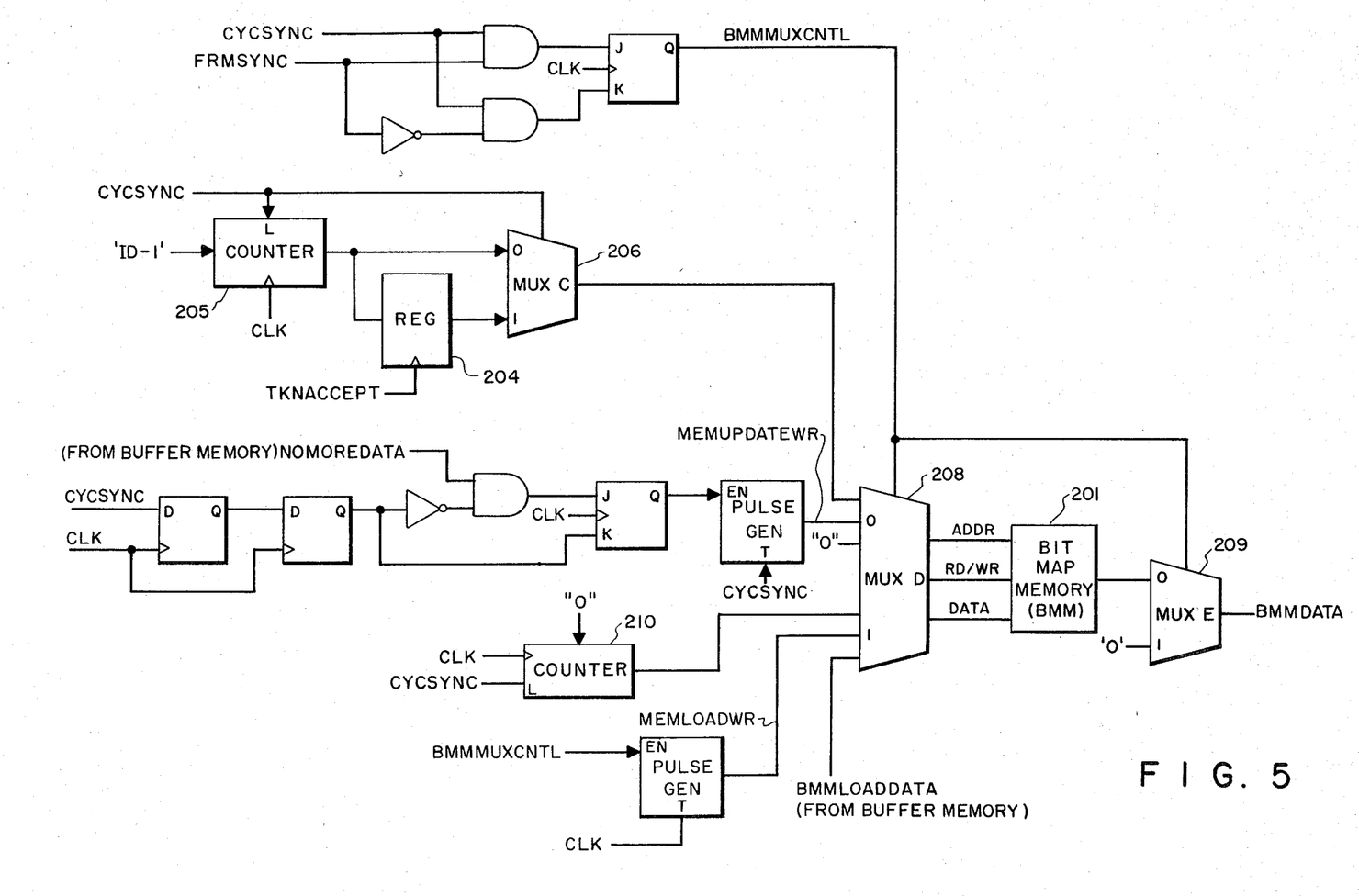
FIG. 5 shows the interface logic of each router for interfacing with its respective buffer memory.

The interface logic of each router 20 which interfaces with the buffer memory 40 shown in FIG. 5. A 64×1 bit map memory (BMM) 201 contains a flag bit for each router 20 indicating if data is currently stored in the buffer memory 40 for each of the routers. The BMM 201 is organized such that location 0 contains a flag for router 0, location 1 contains a flag for router 1, . . . , a logic 1 (or binary 1 value) indicating data is currently stored in the buffer memory 40 for the designated router 20. Down counter 205 keeps track of the router which initially transmitted the token currently being examined by the token logic, more specifically, identifies the token currently latched in register 103 of the token logic.

At the beginning of each cycle, down counter 205 is initially loaded with a value of "ID −1". As a token is transmitted into the register 103 on the token ring input 70 each clock time, the value in the down counter 205 is also decremented by one each clock time thereby allowing the logic to identify the token currently latched in register 103. The value currently being stored in down counter 205 is coupled to the address lines of BMM 201 via MUX C 206 and MUX D 208. The flag bit stored in the BMM 201 is read and coupled onto the BMMDATA line via MUX E 209. BMMDATA is coupled to AND gate 106 of the token logic indicating that data is or is not available to be transmitted. If a control signal NO MORE DATA is received from buffer memory 40 indicating no more data is available for the router selected for transmission during the previous cycle, a write signal MEMUPDATEWR, is generated, at the begining of the cycle zeroing out the flag bit located in bit map memory 201 corresponding to the router identified in register 204. During the first cycle of every frame BMM MUX CNTL goes high, selecting the one input of MUX D 208. BMM LOAD DATA which is the data for the bit map memory 201 from buffer memory 40 is then loaded into the bit map memory 201. The updated BMM data indicates the routers desired to be transmitted to by each router 20 during the new frame.

Figure 6:
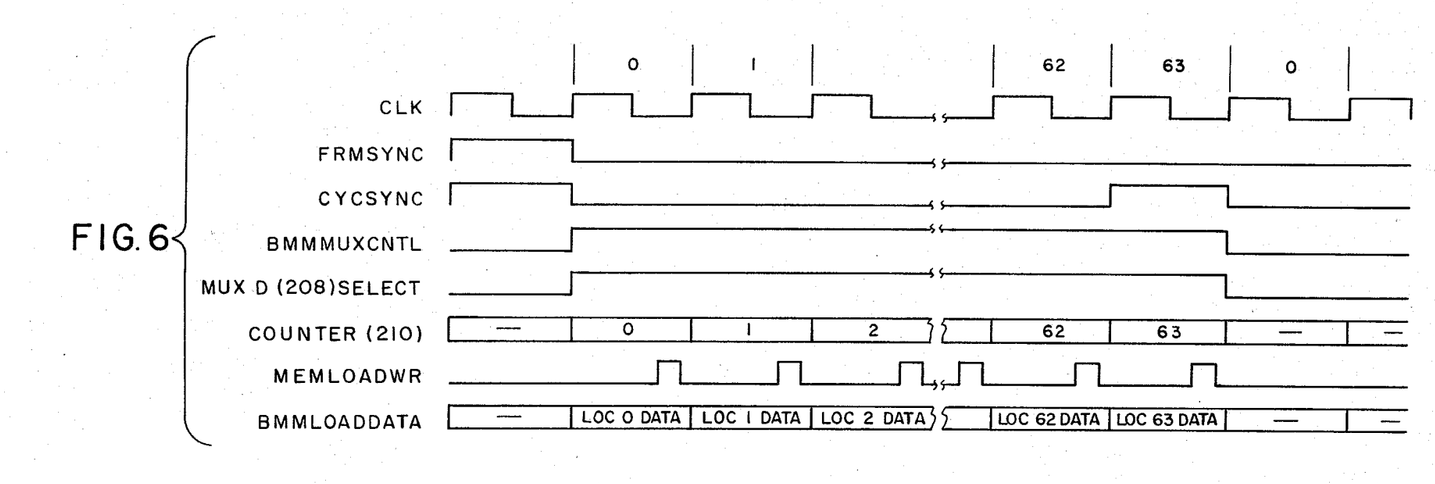
FIG. 6 shows a timing diagram of each router operation during the first cycle of each frame.

FIG. 6 shows a timing diagram of each router 20 operation during the first cycle of each frame. The clocking signal CLK is shown along with the respective clock times 0-63, and also shown are the timing signals FRMSYNC and CYCSYNC. As mentioned above, BNMMUXCNTL, which controls MUX D 208 and MUX E 209, is high during the first cycle of each frame. Counter 210 is initialized to 0 during the beginning of the first cycle of each frame and is incremented thereafter by each clock signal CLK. The contents of counter 210 generates the addresses of BMM 201 and is utilized to load the flag data from buffer memory 40. The write signal, MEMLOADWR, is generated each clock time during the first cycle of each frame thereby allowing the corresponding BMMLOADDATA to be written into the bit map memory 201.

Figure 7:
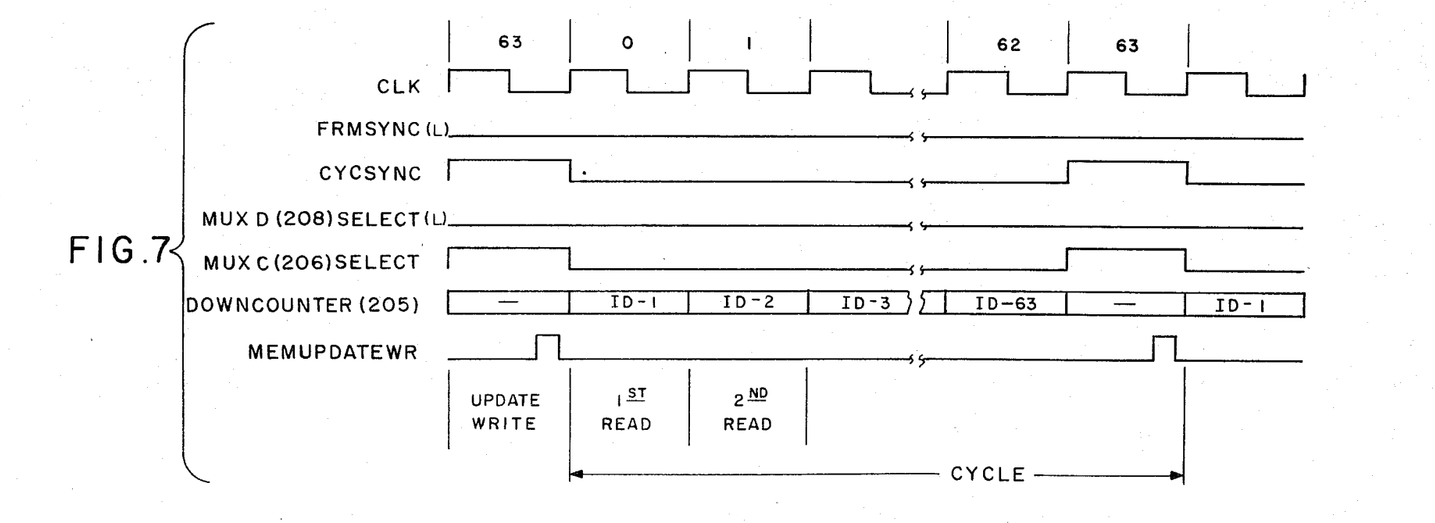
FIG. 7 shows a timing diagram of each router operation during each cycle of a frame exclusive of the first cycle.

FIG. 7 shows a timing diagram of each router 20 operation during each cycle exclusive of the first cycle. The clocking signal CLK is shown along with the clock times 0-63, and the timing signals FRMSYNC and CYCSYNC. As mentioned above, BMMMUXCNTL is low during the subsequent cycles of a frame thereby allowing the bit map memory 201 to be read for the generation of the proper BMMDATA signal. Although the memory update write signal, MEMUPDATEWR, is present, this is only the case when no more data is available. When NOMOREDATA signal is present, a bit map memory write signal is generated during clock time 63. The write is performed to the memory location of the bit map memory 201 designated by the address stored in register 204. This is accomplished by MUX C (206) select being high during the memory update write cycle. As mentioned above, at the beginning of the cycle down counter 205 is initialized to ID −1 and is decremented each subsequent clock time of the cycle.

Figure 8:
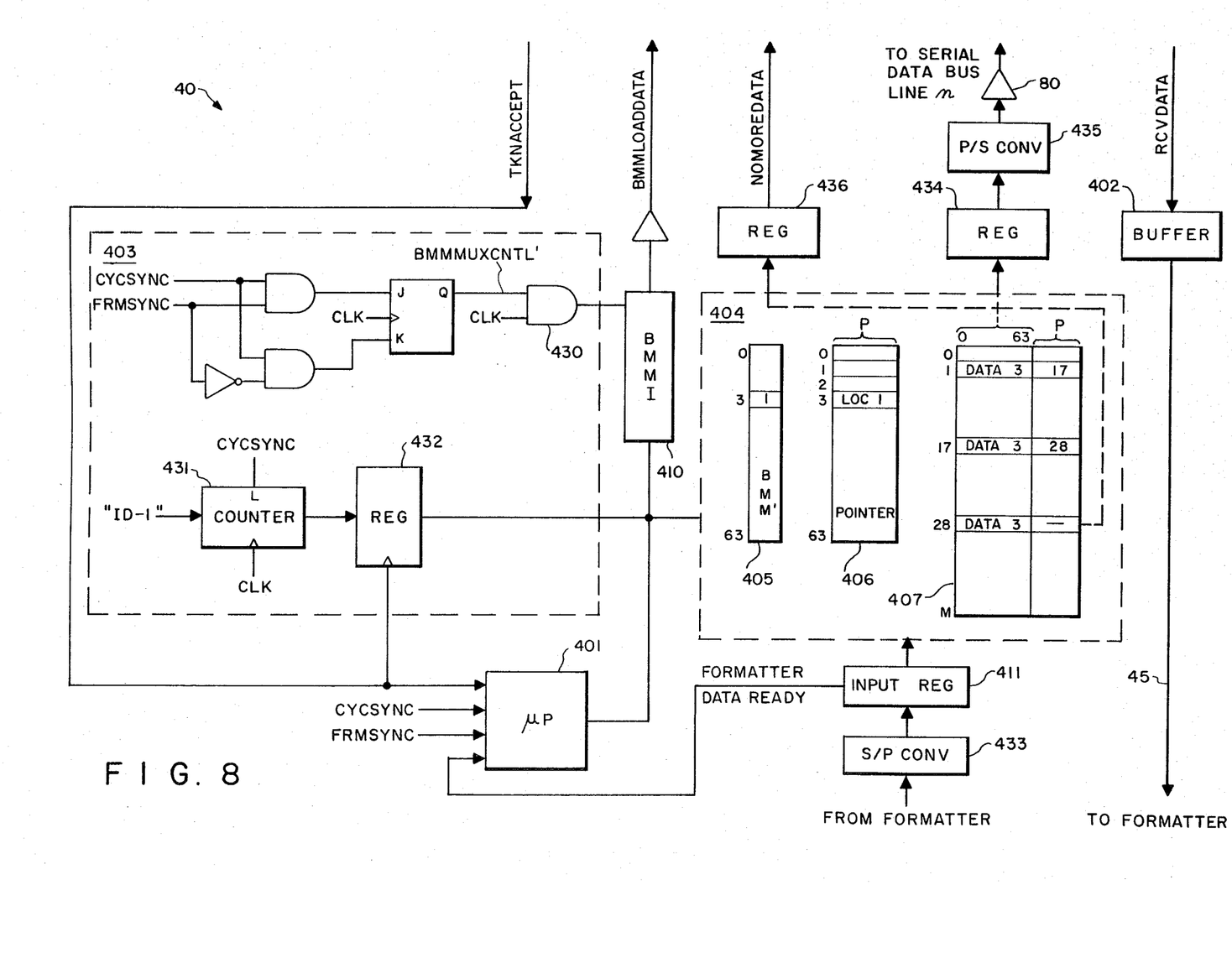
FIG. 8 shows a functional block diagram of the buffer memory of the preferred embodiment of the present invention.

A functional block diagram of the buffer memory 40 is shown in FIG. 8. The buffer memory 40 is controlled by a microprocessor 401. The microprocessor ($\mu p$) 401 is operatively connected to router interface logic 403, a FIFO memory (BMMI) 410, data memory 404, and input register 411. A number of interrupts are supplied to the up 401 thereby providing the necessary timing and status inputs, including signals TKNACCEPT, CYCSYNC, FRMSYNC, and FORMATTER DATA READY. Date received from the router 20 via the RCVDATA line is temporarily held in a buffer 402 for subsequent transmission to the formatter 30 via data line 45. The router interface logic 403 contains the logic for generating BMMMUXCNTL', a copy of the BMMMUXCNTL signal described above in conjunction with the router interface logic of FIG. 5. BMMMUXCNTL' is used to gate 64 clock pulses through AND gate 430 to clock data out of BMMI 410, the data comprising the bit map memory data loaded in BMM 201. Register 432 latches an ID value received from down counter 431, identifying the router 20 to send data to during the next cycle. Data received from formatter 30 is converted from serial to parallel by S/P CONV 433 and stored in data memory 404 via input register 411 under control of $\mu p$ 401 in conjunction with the control signal FORMATTER DATA READY. The data memory 404 is formatted to include a double buffered version of a BMM' 405, a pointer memory 506, and a data/link memory 407. The BMM' 405 is a 64×1 memory area which supplies the data for the bit memory map 201 to BMMI 410 prior to the transmission of the data to the router 20. The pointer memory 406 is a 64×p memory, the width sufficient to identify the addresses of the data/link memory 407. The data/link memory 407 is a 64+p×M memory, 64 bits containing the data and p bits containing a link pointer. The length of data/link memory 407 is M words and determines the number of cycles N is a frame. The length M is a design choice as a function of the type of data and the data rates of the EUD, and the amount of traffic to be handled by the central station 10. Reg. 434 and P/S CONV 435 form the parallel to serial converter logic to drive data in a serial fashion on to the serial data bus line 50 associated with the buffer memory 40/router 20 pair. Register 436 is a general purpose output register for during the NOMOREDATA signal. The μp 401 of the preferred embodiment can be an INTEL 8086.

The operation of the buffer memory 40 will now be described. The buffer memory 40 operates in essentially two phases, the loading and the unloading phase. Although both phases occur simultaneously, both phases operate independently. The loading phase encompasses the collection of one frame of data from the formatter 30 and loading of the data into the data memory 404. Data received from formatter 30 is converted into parallel form by S/P CONV 433 and latched into input register 411, generating the control signal FORMATTERDATAREADY to the μp 401 indicating the presence of data. Each quantum of data read from input register 411 is loaded into the data/link memory 407 in link list form. Data for the BMM' 405 is also constructed which when completed will indicate the presence or absence of data for a given router as determined by the destination address associated with the data. The BMM' 405 data is loaded into BMMI 410 prior to the end of the loading phase. All of the areas of data memory 404 are double buffered. While the loading phase constructs the link lists and BMM data for the next frame in a first memory area of data memory 404, the unloading phase is using the link list and BMM generated during the previous frame in a second memory area of data memory 404.

For illustrative purposes only, assume the down counter in router interface logic 403 contains a value of three when the TKNACCEPT signal is received. This signifies that data is to be transmitted to router 3. As shown in BMM' 405, location 3, which corresponds to data for router 3, is a one. The corresponding pointer memory 406 indicates that data for router 3 is stored in location 1 of the data/link memory 407. On the subsequent cycle location 1 is fetched and the data (denoted as DATA3) stored therein is for router 3 and is outputted to the serial data bus line n which corresponds to the transmitting router. The pointer indicates more data for router 3 is stored in location 17. The pointer memory 406 is then updated to indicate location 17. Hence, on subsequent cycles of the frame when the router accepts the token for router 3, data is then fetched from data/link memory 407 from location 17. In the same fashion more data for router 3 is stored in this example in location 28 and pointer memory 406 is then updated to contain the value of 28. On subsequent cycles of the frame when the token for router 3 is again accepted, location 28 is fetched for data 3 and outputted to the serial data bus line n. However, in this case the link pointer indicates no more data is available and hence the NOMOREDATA signal is outputted to the router. In addition, the BMM' 405 in location 3 is zeroed out indicating no more data is available for router 3 during this frame.

In the preferred embodiment of the present invention, data memory 404 is double buffered. That is, a duplicate of buffer memory 404 is included such that one data memory 404 is interfacing with the router during a first frame while the other data memory 404' is interfacing with the formatter (i.e., is being loaded from the formatter). On the subsequent frame the data memory 404' which has just been loaded from the formatter is now interfacing with the corresponding router 20 while the data memory which has transmitted all the data stored in data/link memory 407 is now interfacing with formatter 30. This is accomplished under the control of microprocessor 401.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A central station, having a plurality of input/output formatters operatively connected to said central station, each input/output formatter having a plurality of devices coupled thereto, for exchanging data from a first of said plurality of input/output formatters to a second of said plurality of input/output formatters, said central station comprising:
   (a) a plurality of router means, each of said router means operatively connected to a serial data bus, wherein said serial data bus includes a plurality of serial data bus lines, and each of said router means operatively connected to a next adjacent router means via a plurality of parallel lines thereby forming a ring, each of said router means for controlling the exchange of said data in response to a corresponding control message transmitted by each of said router means via said ring during a first cycle to indicate transmission of said data from the first of said plurality of input/output formatters on its corresponding serial data bus lines during a next sequential cycle; and
   (b) a plurality of buffer memory means, each buffer memory means operatively connected to a corresponding router means and operatively connected to a corresponding input/output formatter, and further operatively connected to the corresponding serial data bus line of said serial data bus, for interfacing with the corresponding router means to cause said data to be operatively coupled to and from the serial data bus in response to said control message.

2. A central station, according to claim 1, wherein each of said router means comprises:
   (a) logic means for processing said control message; and
   (b) interface means for co-ordinating the data exchange with said buffer means in response to said control message.

3. A central station, according to claim 2, wherein said logic means comprises:
   (a) means for initiating said control message;
   (b) means for interrogating said control message to determine whether the control message indicates the router is available for receiving data during the next sequential cycle;
   (c) means for modifying said control message to indicate whether data is to be transmitted to the router initiating said control message and further to indicate which of said plurality of buffer means is to be transmitting data during the next sequential cycle;
   (d) decoder means for decoding said control message at the start of the next sequential cycle to enable the serial data bus line corresponding to the buffer means which is to transmit data during the next sequential cycle, thereby causing receipt of data;

(e) means for receiving said control message from said ring; and (f) means for transmitting said control message onto said ring.

4. A central station, according to claim 3, wherein said interface means comprises:

(a) means for identifying the router means initiating said control message; and (b) means for indicating which of said plurality of router means data is available.

5. A central station, according to claim 4, wherein said interface means further comprises:

means for updating said means for indicating, the means for updating being initialized at the beginning of each frame, each frame comprising a predetermined number of cycles.

6. A central station, according to claim 5, wherein each of said buffer memory means comprises:

(a) data memory means, operatively connected to a corresponding serial data bus line, for storing data received from said input/output formatter in a linked list format;

(b) first buffer means, operatively connected to said input/output formatter and further operatively connected to said data memory means, for temporarily holding data received from said input/output formatter;

(c) processor means, operatively connected to said first buffer means and to said data memory means, for controlling the transfer of said data into and out of said data memory means in response to at least one control signal; and (d) router interface logic means for identifying the router means which is to receive data during the next sequential cycle.

7. A central station, according to claim 6, wherein each of said buffer memory means further comprises:

storage means, operatively connected to said means for indicating, for storing information to indicate which of said plurality of router means data is available, said information being loaded into said means for indicating at the beginning of each frame.

8. A central station, according to claim 7, wherein each of said buffer memory means further comprises:

second buffer means, operatively connected to said decoder means and to said input/output formatter, for temporarily storing data received from a first of said plurality of input/output formatters to transmit said data to the corresponding input/output formatter.

9. A central station, having a plurality of input/output formatters operatively connected to said central station, each input/output formatter having a plurality of devices coupled thereto, for exchanging data from a first of said plurality of input/output formatters to a second of said plurality of input/output formatters, said central station comprising:

(a) n router means, where n is an integer greater than 1, each of said router means operatively connected to a serial data bus, wherein said serial data bus includes a plurality of serial data bus lines, and each of said router means operatively connected to a next adjacent router means via a plurality of parallel lines thereby forming a ring, each router means for controlling the exchange of said data in response to a corresponding control message transmitted by each of said router means via said ring during a first cycle to indicate transmission of said data from the first of said plurality of input/output formatters on its corresponding serial data bus lines during a next sequential cycle; and (b) n buffer memory means, each buffer memory means operatively connected to a corresponding router means and all but the last router means operatively connected to a corresponding input/output formatter, each buffer memory means operatively connected to the corresponding serial data bus line of said serial data bus, for interfacing with the corresponding router means to cause said data to be operatively coupled to and from the serial data bus in response to said control message.

* * * * *